(12) United States Patent
Ren et al.

(10) Patent No.: US 8,374,389 B2
(45) Date of Patent: Feb. 12, 2013

(54) IRIS DEBLURRING METHOD BASED ON GLOBAL AND LOCAL IRIS IMAGE STATISTICS

(75) Inventors: Liu Ren, Sunnyvale, CA (US); Xinyu Huang, Norfolk, VA (US); Ruigang Yang, Lexington, KY (US)

(73) Assignee: Robert Bosch GmbH, Stuttgart (DE)

( * ) Notice: Subject to any disclaimer, the term of this patent is extended or adjusted under 35 U.S.C. 154(b) by 1010 days.

(21) Appl. No.: 12/367,038

(22) Filed: Feb. 6, 2009

(65) Prior Publication Data

US 2010/0202667 A1 Aug. 12, 2010

(51) Int. Cl.
*G06K 9/00* (2006.01)
(52) U.S. Cl. ....... 382/103; 382/115; 382/118; 340/5.82; 902/3; 902/5
(58) Field of Classification Search ............... 382/103, 382/115, 117, 118; 340/5.81, 5.82; 902/3, 902/5
See application file for complete search history.

(56) References Cited

U.S. PATENT DOCUMENTS

| | | | | |
|---|---|---|---|---|
| 5,715,325 | A * | 2/1998 | Bang et al. | 382/118 |
| 6,474,683 | B1 * | 11/2002 | Breed et al. | 280/735 |
| 6,820,897 | B2 * | 11/2004 | Breed et al. | 280/735 |
| 6,850,252 | B1 * | 2/2005 | Hoffberg | 715/716 |
| 7,027,054 | B1 * | 4/2006 | Cheiky et al. | 345/473 |
| 7,436,986 | B2 * | 10/2008 | Caldwell | 382/117 |
| 7,813,822 | B1 * | 10/2010 | Hoffberg | 700/94 |
| 7,944,467 | B2 * | 5/2011 | Silveira et al. | 348/78 |
| 8,121,356 | B2 * | 2/2012 | Friedman et al. | 382/115 |

OTHER PUBLICATIONS

J. R. Matey, K. Hanna, R. Kolczynski, D. Lolacono, S. Mangru, O. Naroditsky, M. Tinker, T. Zappia and W. Y. Zhao, "Iris on the Move: Acquisition of Images for Iris Recognition in Less Constrained Environments," Proceeding of IEEE, vol. 94, Issue 11, Nov. 2006 at pp. 1936-1947 (Summary attached 1 page).
G. Guo, M. Jones and P. Beardsley, "A System for Automatic Iris Capturing," Mitsubishi Electric Research Laboratories, Massachusetts, TR2005-044, Jun. 2005 (10 pages).
S. Yoon, H. G. Jung, J. K. Suhr, and J. Kim, "Non-Intrusive Iris Image Capturing System Using Light Stripe Projection and Pan-Tilt-Zoom Camera," IEEE Conference, Biometrics Workshop; Computer Vision and Pattern Recognition, Published Jun. 17-22, 2007, pp. 1-7, at Minneapolis, MN (Abstract attached 1 page).
B. J. Kang and K. R. Park, "Real-Time Image Restoration for Iris Recognition Systems," IEEE Transactions on Systems, Man, and Cybernetics, Part B, vol. 37, Issue 6 on pp. 1555-1566, Dec. 2007 (Abstract attached 1 page).
A. Levin, R. Fergus, F. Durand and W. T. Freeman, "Image and Depth From a Conventional Camera with a Coded Aperture," Massachusetts Institute of Technology, Computer Science and Artificial Intelligence Laboratory, ACM Transactions on Graphics, 2007. (9 pages).
Q. Shan, J. Jia and A. Agarwala, "High-Quality Motion Deblurring from a Single Image," The Chinese University of Hong Kong, Department of Computer Science and Engineering; ACM SIGGRAPH conference, 2008. (10 pages).
R. Fergus, B. Singh, A. Hertzmann, S. T. Rowels, and W. T. Freeman, "Removing Camera Shake from a Single Photograph," MIT CSAIL, University of Torronto; ACM Transactions on Graphics, 2006. (8 pages).

* cited by examiner

*Primary Examiner* — Yosef Kassa
(74) *Attorney, Agent, or Firm* — Taft Stettinius & Hollister LLP (57) ABSTRACT

A method of identifying a living being includes using a camera to capture a blurred visual image of an iris of the living being. The blurred visual image is digitally unblurred based on a distribution of eye image gradients in an empirically-collected sample of eye images and characteristics of pupil region. The unblurred image is processed to determine an identity of the living being.

17 Claims, 12 Drawing Sheets

IRIS DEBLURRING METHOD BASED ON GLOBAL AND LOCAL IRIS IMAGE STATISTICS

BACKGROUND

1. Field of the Invention

The present invention relates to apparatuses and methods for identifying personnel and, more particularly, to apparatuses and methods for identifying personnel based on visual characteristics of the irises of their eyes.

2. Description of the Related Art

Iris recognition, or "iris capture" is a method of biometric personal identification that uses pattern recognition algorithms based on images of at least one of the irises of an individual's eyes. Iris recognition uses camera technology to produce images of the details of the iris. These images are converted into digital templates and provide mathematical representations of the iris that are used to identify individuals.

For most iris capturing systems, captured iris images easily blur when the user is out of the depth of field (DOF) of the camera, or when he is moving. The common solution is to have the user try the system and have the system read his iris again, as the quality of the previously captured blurred iris images is not good enough for recognition.

What is neither disclosed nor suggested in the art is an iris capture system that can correct and/or compensate for blurring of captured images such that the need to repeat the capturing of the iris image due to blurring is reduced.

SUMMARY

The present invention provides a novel iris deblurring algorithm that can be used to improve the robustness or nonintrusiveness of all iris capturing systems. Unlike other iris deblurring algorithms, the domain knowledge (or prior knowledge) inherent in iris images is utilized. This domain knowledge may be in the form of statistics related to global iris images (i.e., images of the iris and surrounding area, perhaps including some skin), or statistics related to characteristics of local pupils or highlights (i.e., the portion of the pupil reflecting the highest brightness of light to the camera), for example.

In one embodiment, the present invention comprises a method of identifying a living being, including using a camera to capture a blurred visual image of an iris of the living being. The blurred visual image is digitally unblurred based on a distribution of eye image gradients in an empirically-collected sample of eye images. The unblurred image is processed to determine an identity of the living being.

In another embodiment, the present invention comprises a method of identifying a living being, including using a camera to capture a blurred visual image of an iris of the living being. The blurred visual image is digitally unblurred based on local color value statistics derived from measurements of a population of pupils, and global color value statistics derived from measurements of a population of eye regions. The unblurred image is processed to determine an identity of the living being.

In yet another embodiment, the present invention comprises a method of identifying a living being, including capturing a blurred visual image of an iris of the living being. The blurred visual image is digitally unblurred based on local highlight color value statistics derived from measurements of highlight regions of a population of pupils; local non-highlight color value statistics derived from measurements of non-highlight regions of a population of pupils; and global color value statistics derived from measurements of a population of eye regions. The unblurred image is processed to determine an identity of the living being.

An advantage of the present invention is that it can correct blurred images such that they are useful in iris recognition.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
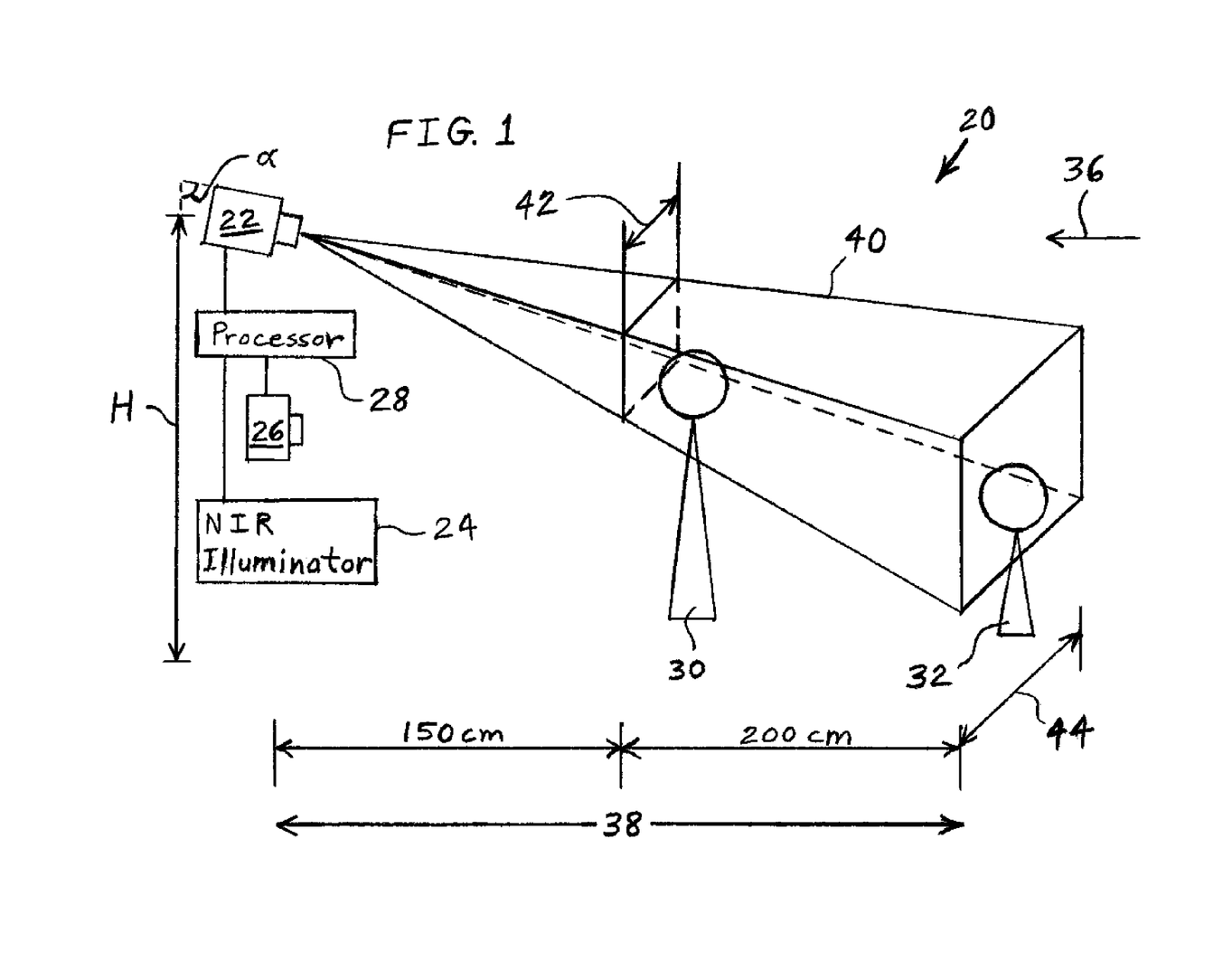
FIG. 1 is a block diagram of one embodiment of an iris capture system according to one embodiment of the invention.

Turning now to the drawings, and particularly to FIG. 1, there is shown one embodiment of an iris capture system 20 of the present invention including an NFOV NIR camera 22 with adjustable focus, an NIR illuminator 24, and a depth sensor 26 all in electronic communication with a central processor 28. System 20 may capture images of, and detect the positions of, moving subjects such as a human being 30 or a human being 32 when he approaches a doorway at which camera 22, illuminator 24 and sensor 26 are mounted, such as in a direction indicated by arrow 36. Camera 22 may be installed with a mounting height H and tilt angle α such that a standoff distance 38 for the user is approximately between 1.5 meters and 3.5 meters and the captured iris diameter is above 150 pixels. In one embodiment, height H is about 250 centimeters. The width of a capture volume 40 may be on the order of 20 centimeters. In the embodiment illustrated in FIG. 1, a width 42 of capture volume 40 where the image and shape of the taller person 30 are captured is about 17 centimeters, and a width 44 of capture volume 40 where the image and shape of the shorter person 32 are captured is about 30 centimeters. There are many devices known for measuring depth information, such as stereo cameras, time-of-flight sensors, and structure lights.

In embodiments in which NFOV camera 22 does not have panning and tilting capabilities, the human being whose image and shape are being captured needs to look at camera 22 while approaching the doorway. The iris capture may be triggered at different standoff distances for users with different heights.

Depth sensor 26 may be installed at various positions and orientations. Depth sensor 26 may be positioned very close to NFOV camera 22 to allow for a more compact design. NIR illuminator 24 can be placed at any location so long as it illuminates capture volume 40.

System 20 can be applied to other possible settings in which depth sensor 26 is used. For example, camera 22 may be in the form of a high speed, high performance video camera. Alternatively, camera 22 may have a fixed focus or adjustable focus based on the distance between the camera and the user. It is also possible for camera 22 to include pan-tilt capabilities in order to further enlarge the capture volume.

Figure 2:
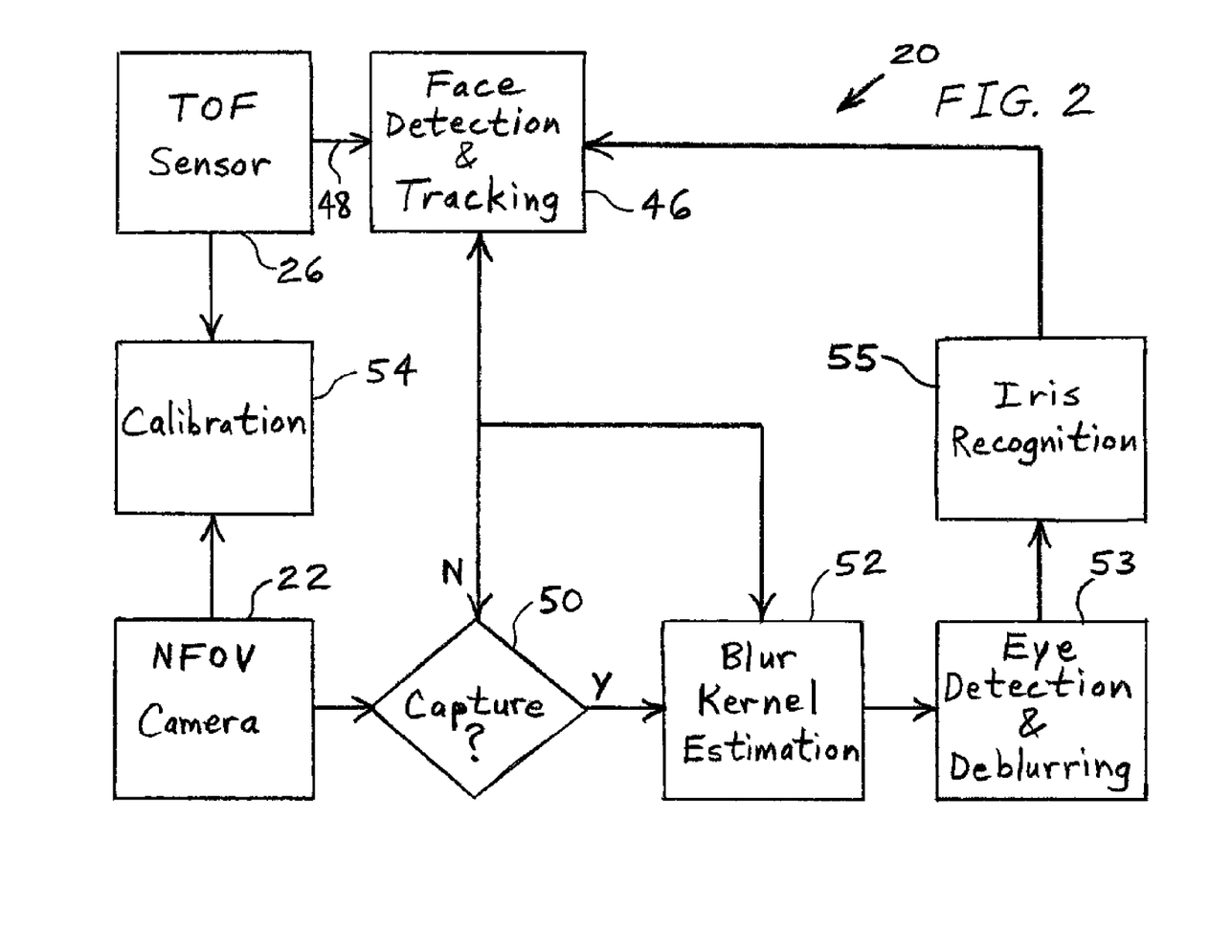
FIG. 2 is an operational block diagram of the iris capture system of FIG. 1.

An operational block diagram of system 20 is illustrated in FIG. 2. The three-dimensional information measured by depth sensor 26 may be used in various ways within system 20. First, face detection and tracking 46 may be performed on the up-sampled intensity images 48 captured by depth sensor 26. The three-dimensional position of the eyes may then be estimated from an upper portion of the detected face depth maps. The next eye location for the moving subject may be predicted accurately in real time. For example, time rates of change of the three-dimensional position of the eyes may be extrapolated to predict future eye locations. Second, the three-dimensional position may be used to determine whether eyes are within the field of view and whether the stand-off distance is within the depth of field. If these two conditions are satisfied, the NFOV camera may be instructed to perform image capturing, as at 50. Third, the depth information may be used to dynamically control the focus position of the lens of NFOV camera 22. Finally, the depth information can be used to estimate the blur kernel 52 for iris deblurring, as at 53. The deblurring may be useful in an iris recognition algorithm 55. More accurate depth information could be used to predict the speed and future positions of the human being so that the real or desired focus position can be estimated more accurately even when the system delay exists. The real or desired focus position may represent the focus position that is ideal for the future estimated position of the human being.

Calibration between NFOV camera 22 and depth sensor 26 may be performed, as at 54. In one embodiment, depth sensor 26 could be a TOF sensor. Many existing TOF sensors contain systematic depth bias from the demodulation of correlation function and incident lights, and so calibration, or so-called "precalibration," of the TOF sensor may obtain a better depth measurement. In a first step of a novel calibration method of the present invention, a large planar board may be positioned at different depths and with different orientations. A robust plane fitting may then be applied for the planar board at each position. The depth bias may be estimated by computing the difference between measured depth and the fitted plane. After the calibration of TOF sensor 26, the depth uncertainty may be greatly reduced, especially the depth uncertainty between 1.3 and 2 meters. In order to transform the depth in the coordinate system of TOF sensor 26 to that of NFOV camera 22, a full system calibration may be performed. The NFOV camera with a telephoto lens may be approximated as an affine camera. A planar checkerboard pattern is captured at different depths. As the correspondences between the two-dimensional points x from NFOV camera 22 and three-dimensional points X from TOF sensor 26 are known, the projection matrix P can be computed by minimizing the re-projection errors. The intrinsic and extrinsic matrices may be obtained by RQ decomposition of P.

Blur kernel estimation step 52 for iris deblurring is optional. As long as the iris deblurring algorithm needs to use the accurate depth information, the depth information provided by TOF sensor 26 may be sufficient. When depth information is not available in capturing systems, some statistics of the captured image (e.g., focus scores) may be used to estimate blur kernel.

Image blur may be modeled as a convolution process:

$$I = L \otimes h + n \qquad (1)$$

where I, L, h, and n represent the blurred image; un-blurred image; point spread function (PSF) or blur kernel; and additive noise, respectively. For defocus blur, the PSF h depends on the circle of confusion R. For cameras with adjustable focus, R is a function of two parameters based on the typical pin-hole camera model. The two parameters are the distance from the object to the lens d and the distance between the lens and the image plane s, $$R = \frac{Ds}{2} \left| \frac{1}{f} - \frac{1}{d} - \frac{1}{s} \right| \qquad (2)$$

where D is the radius of the lens, and f is the focal length of the lens. For cameras with fixed focus s, R is determined only by d.

The PSF h for the defocus blur may be modeled as a Gaussian kernel, $$h = \frac{1}{2\pi\sigma_h^2} e^{-\frac{x^2+y^2}{2\sigma_h^2}}. \qquad (3)$$

Because the captured eye region is usually parallel to the image plane, the PSF h may be shift-invariant.

The blur kernel estimation method of the present invention will now be described with the assumption in place that the depth difference is measured. When the fixed focus cameras are used, it is relatively simple to estimate the kernel. The kernel estimation method of the present invention may deal with the more general case, i.e., cameras with adjustable focus. As mentioned above, the depth difference may be mainly caused by the system delay when a subject is moving.

As the lens focus position $p_f$ is proportional to the distance between the lens and image plane s, when the circle of confusion R is small enough, the relationship between the in-focus position of lens $p_f$ and d may be derived based on Equation (2), $$p_f = \frac{d}{k_1 d + k_2}. \quad (4)$$

Figure 3:
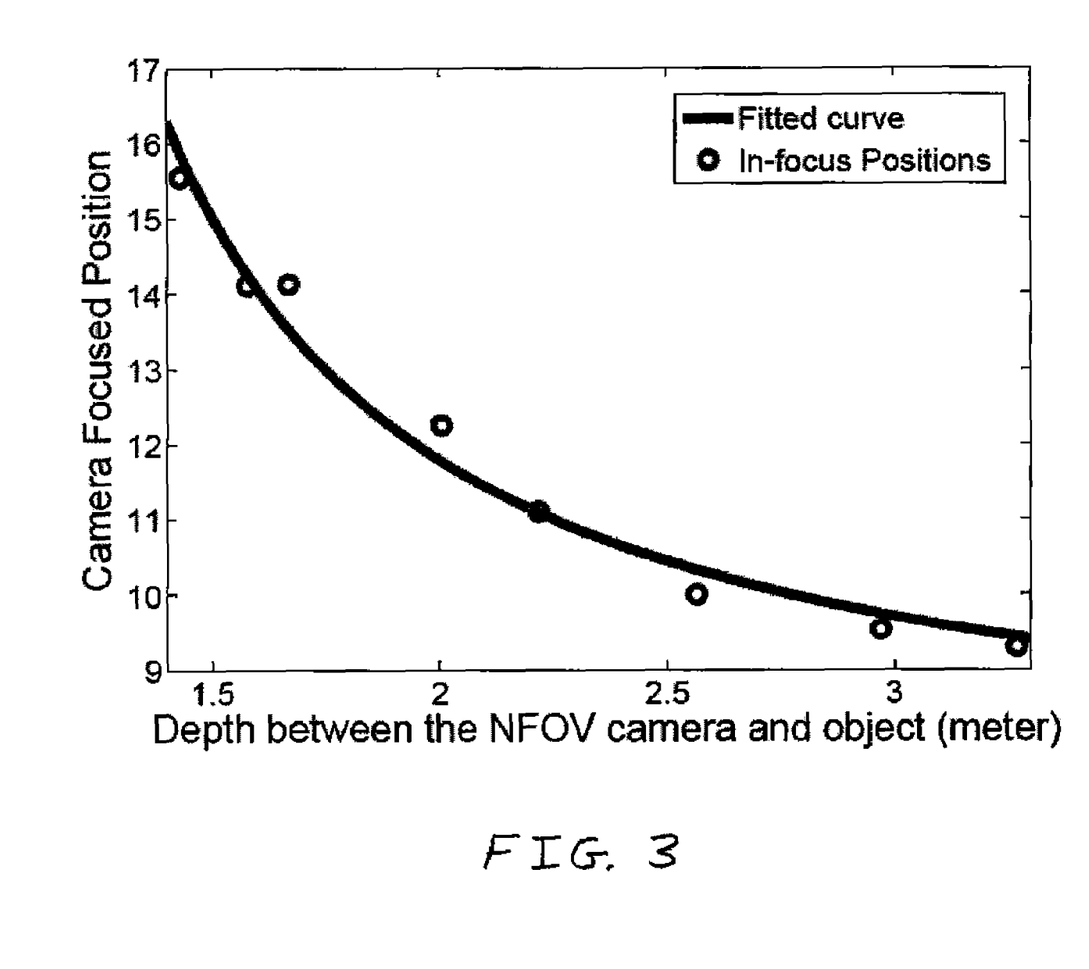
FIG. 3 is an example of a fitted curve for the measured focus positions of the camera of the system of FIG. 1 as a function of the depth between the camera lens and the object.

After measuring focus positions from in-focus images at different depths, $k_1$ and $k_2$ can be easily estimated by curve fitting using Equation (4). FIG. 3 shows an example of a fitted curve for the measured focus positions and depths.

As the standard deviation of the blur kernel Gaussian distribution $\sigma_h$ is proportional to R and s is proportional to $p_f$, when d is fixed, the relationship between $\sigma_h$ and $p_f$ may be derived, based on Equation (2), $$\sigma_h = |k_3 p_f + k_4|. \quad (5)$$

Although the parameters $k_1$, $k_2$, $k_3$ and $k_4$ are characteristics of the camera system, they have no obvious physical meaning or representation. The standard deviation $\sigma_h$, which defines the blur kernel Gaussian distribution, cannot be measured directly. Thus, the following novel algorithm of the present invention may estimate $\sigma_h$ and then learn $k_3$ and $k_4$ accordingly.

In a first step of the algorithm, in-focus and defocused checkerboard images are captured under different depths and different focus positions. As in-focus and defocused images are known, only $\sigma_h$ is unknown. The standard deviation $\sigma_h$ is estimated by $\mathrm{argmin}_{\sigma_h} \|1 - L\hat{x}h\|_2^2$. The subscript 2 in the formula denotes a Euclidean Norm or a L2-Norm.

In a next step, $k_3$ and $k_4$ are estimated by $\mathrm{argmin}_{k_3, k_4} \|k_3 p_f + k_4 - \sigma_h\|_2^2$. FIGS. 4a-g show examples of the fitting results for $p_f$ and $\sigma_h$ based on Equation (5). FIGS. 4a-g are plots of the focus position of camera 22 versus a standard deviation of the blur kernel distribution for six different distances between camera 22 and the subject iris. The plot for each of the six distances is V-shaped, with the origin of the "V" being at the in-focus position corresponding to that distance. The parameter $k_3$ may represent the slope of a corresponding V-shaped plot in FIGS. 4a-g; and parameter $k_4$ may represent the y-intercept of the corresponding V-shaped plot. V-shaped plot 60 corresponds to a distance of about 3.30 meters; V-shaped plot 62 corresponds to a distance of about 2.97 meters; V-shaped plot 64 corresponds to a distance of about 2.56 meters; V-shaped plot 66 corresponds to a distance of about 2.00 meters; V-shaped plot 68 corresponds to a distance of about 1.58 meters; and V-shaped plot 70 corresponds to a distance of about 1.43 meters.

Each of the circles in FIGS. 4a-g represents an empirically-collected data point. The data points at the top (standard deviation=20) of FIGS. 4a-g are the images that are severely blurred. It may not be feasible to recover these kinds of severely blurred images in practice even with a large kernel size. Hence, these severely blurred images are treated as outliers and are not included in the estimation.

Based on FIGS. 3 and 4a-g, it can be concluded that the models described in Equations (4) and (5) may be used for real camera systems even though the derivation of Equations (4) and (5) is based on the traditional pin-hole camera model. A practical use of the plots of FIGS. 4a-g is to estimate the blur kernel when the subject is moving.

Figure 4A:
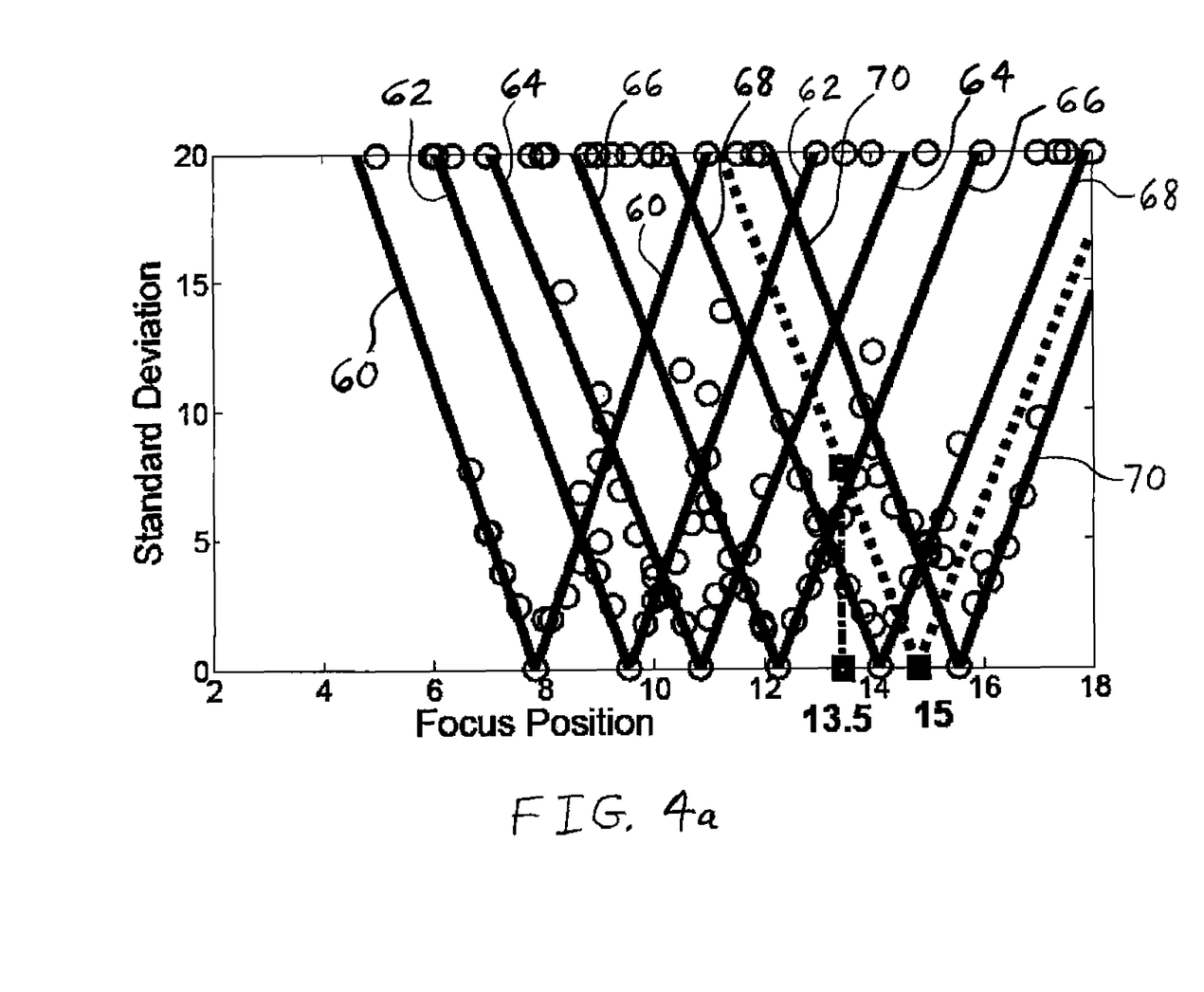
FIG. 4a illustrates examples of plots of the standard deviation of the blur kernel Gaussian distribution as a function of the focus position of the camera of the system of FIG. 1 for various distances between the camera and the iris according to one embodiment of a method of the present invention for visually recognizing an iris.
Figure 4B:
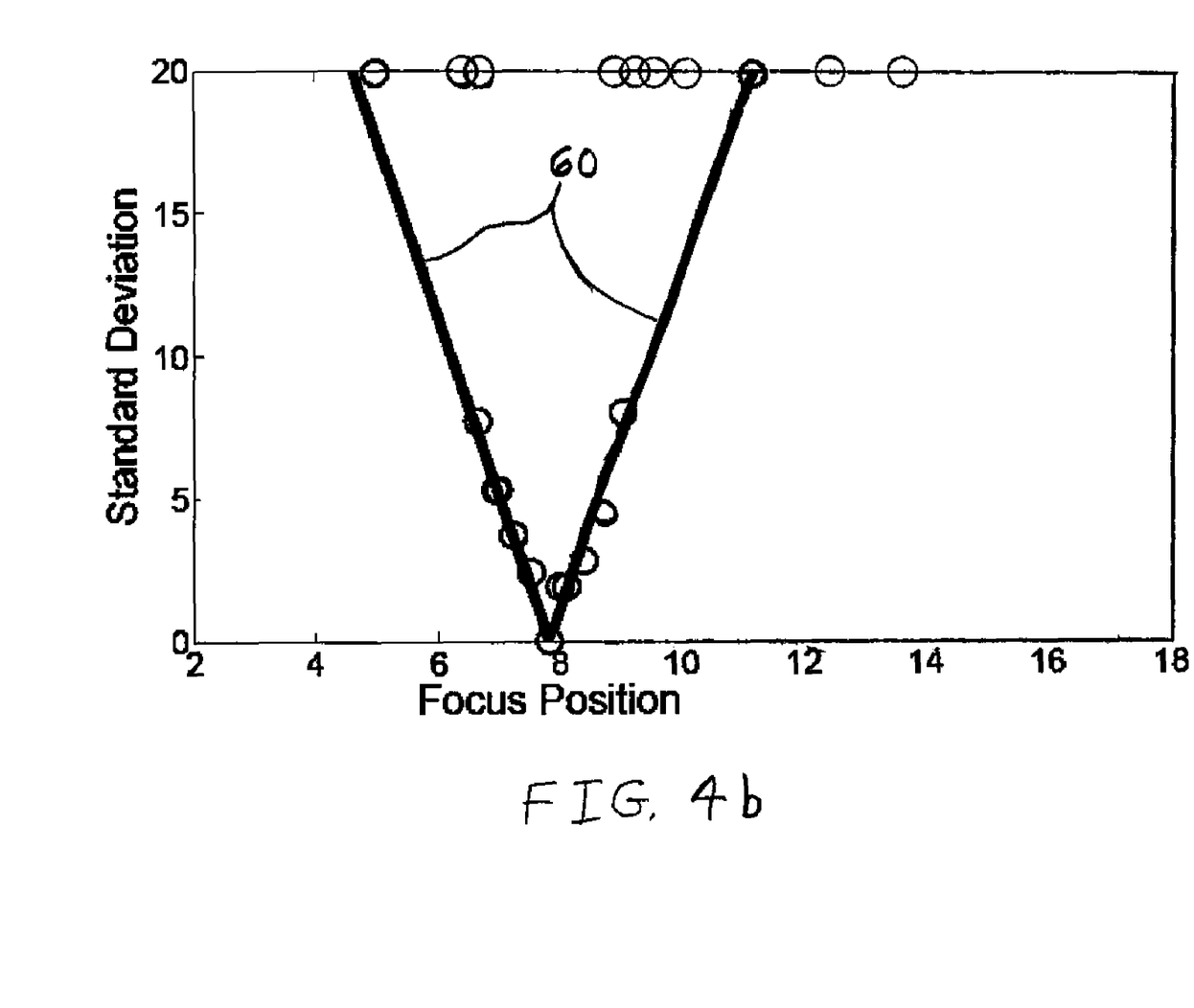
FIG. 4b is the plot of FIG. 4a corresponding to a distance of 3.30 meters between the camera and the iris.
Figure 4C:
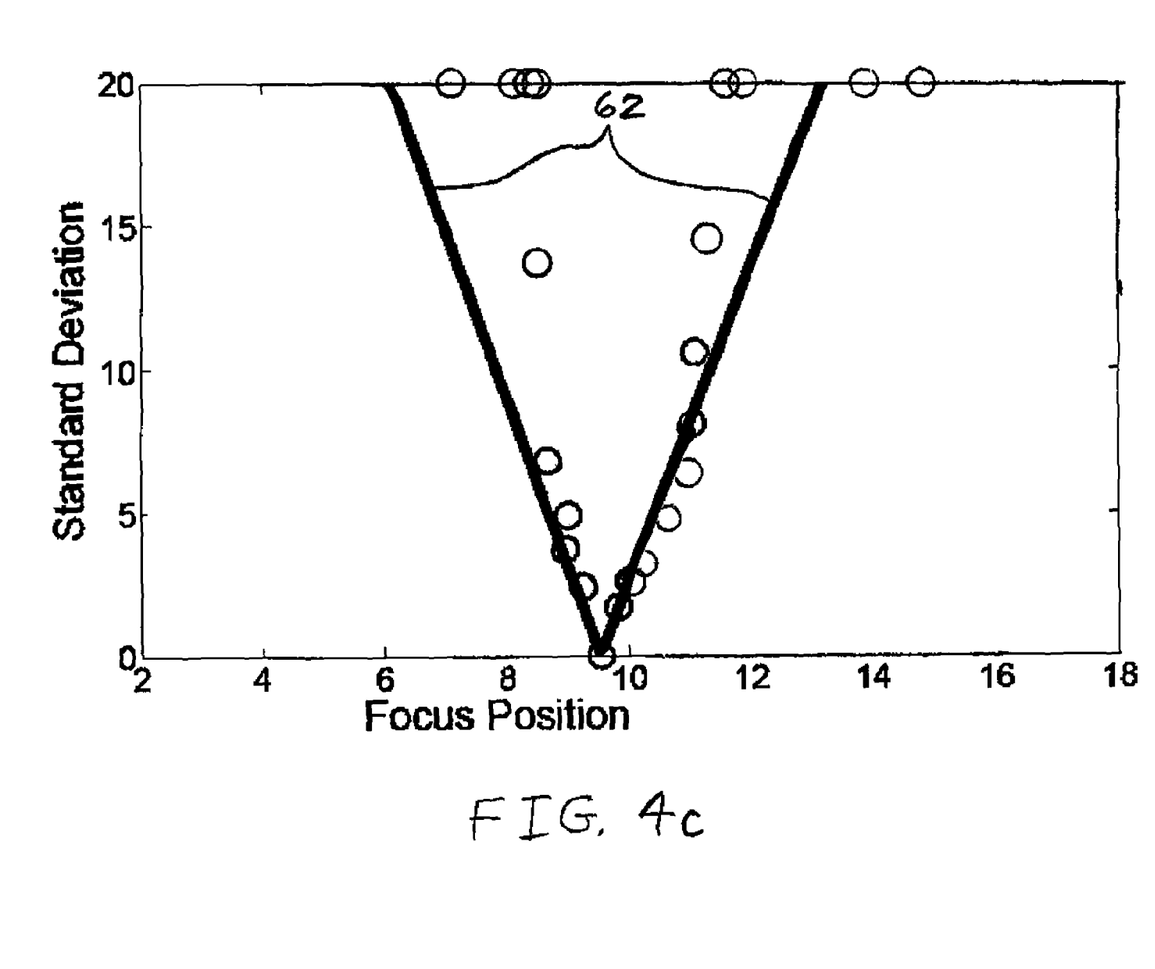
FIG. 4c is the plot of FIG. 4a corresponding to a distance of 2.97 meters between the camera and the iris.
Figure 4D:
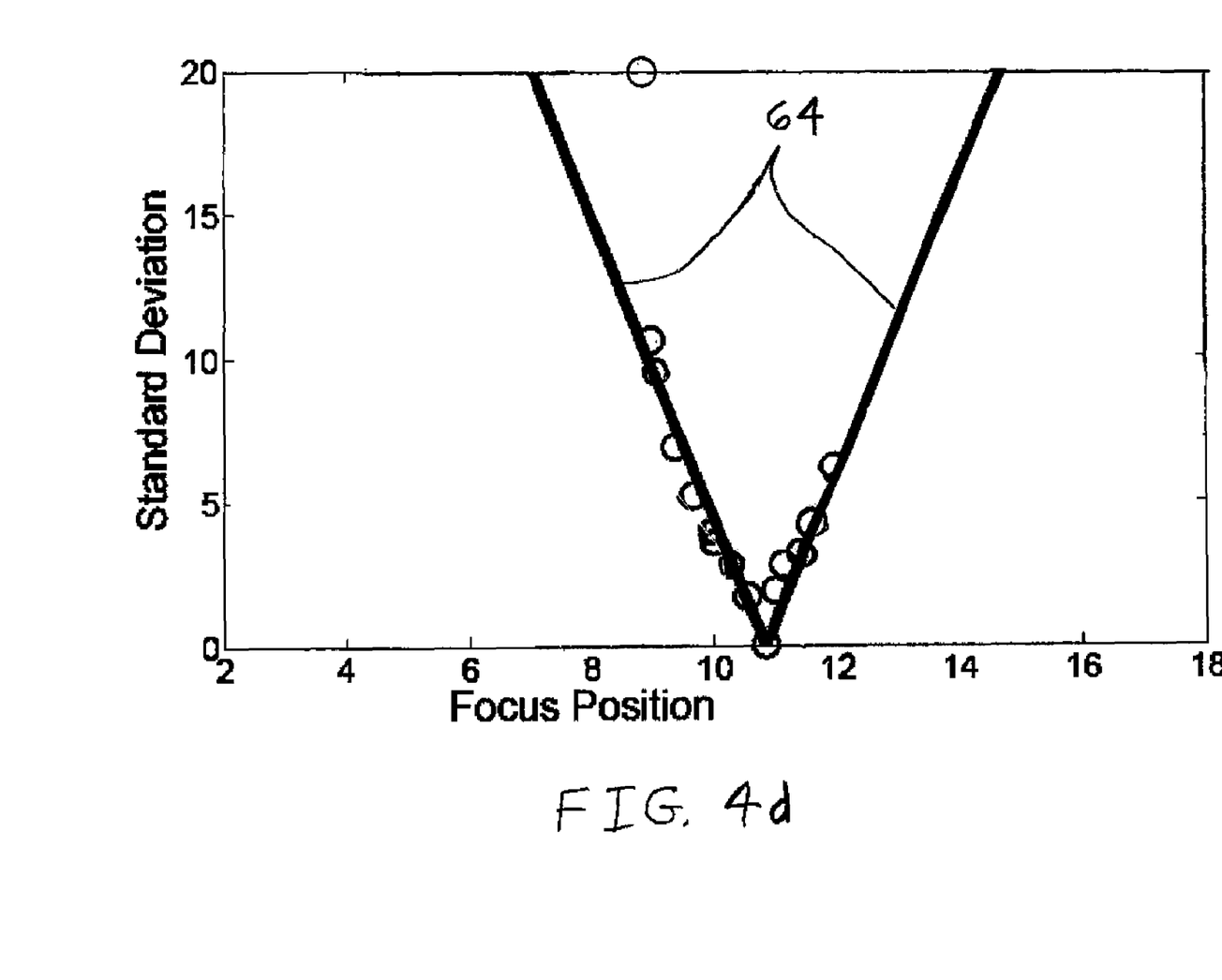
FIG. 4d is the plot of FIG. 4a corresponding to a distance of 2.56 meters between the camera and the iris.
Figure 4E:
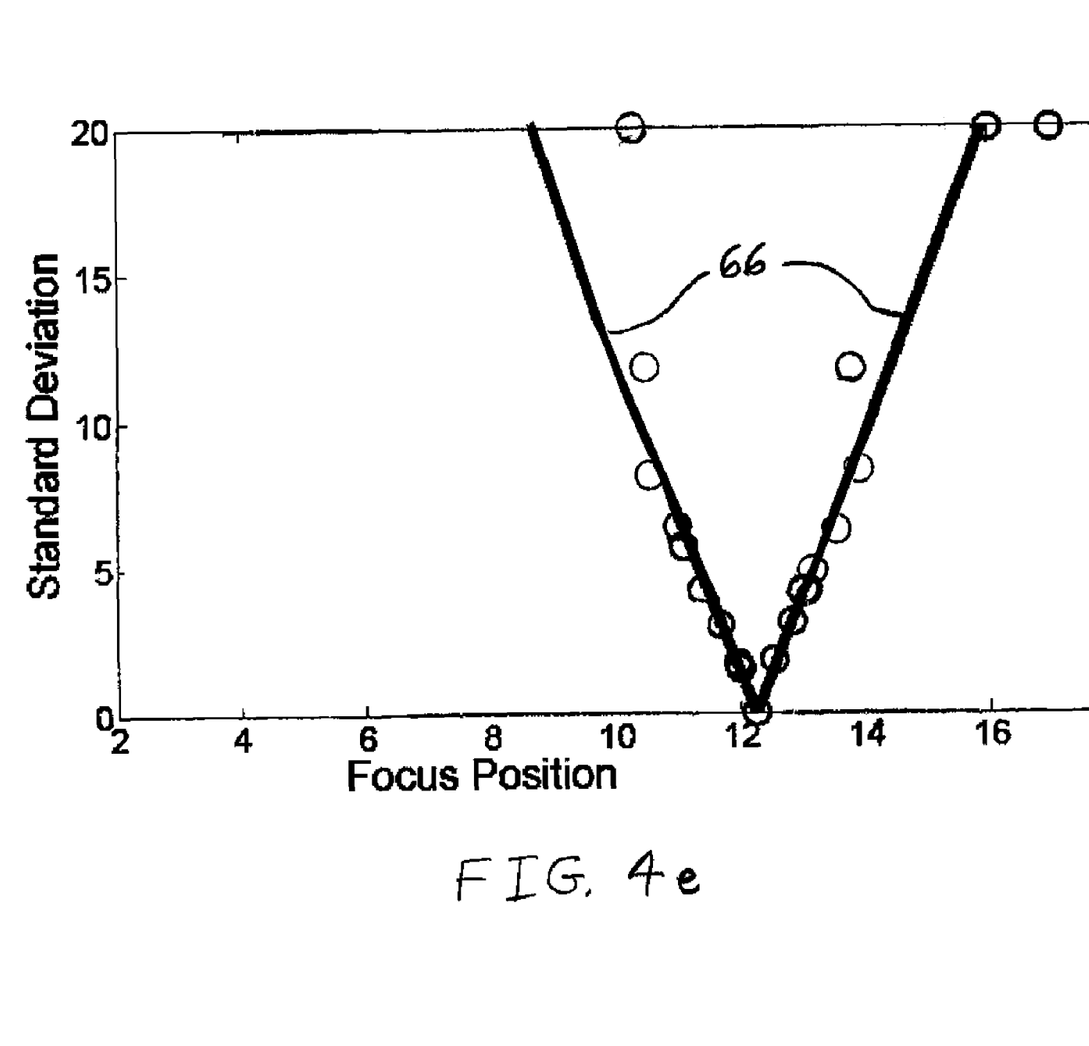
FIG. 4e is the plot of FIG. 4a corresponding to a distance of 2.00 meters between the camera and the iris.
Figure 4F:
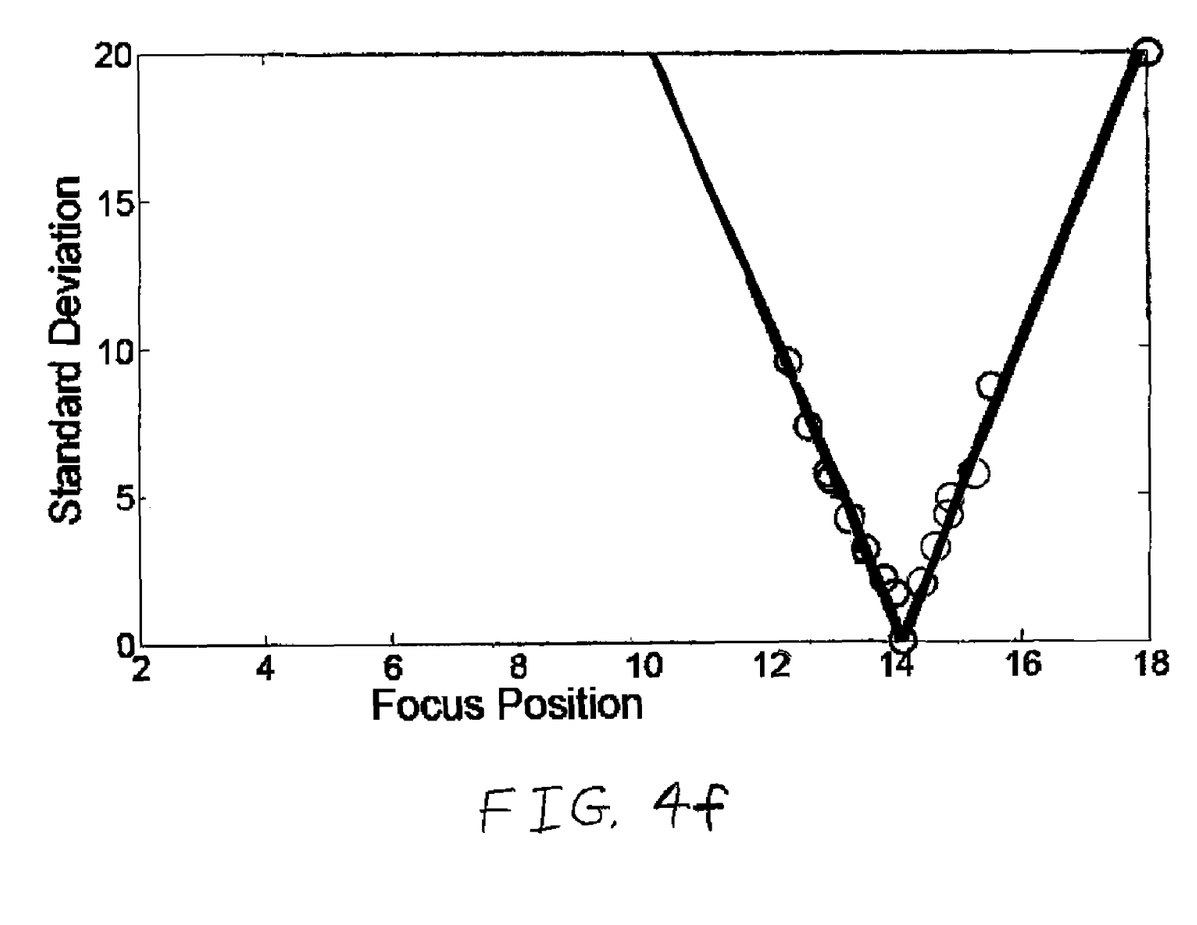
FIG. 4f is the plot of FIG. 4a corresponding to a distance of 1.58 meters between the camera and the iris.
Figure 4G:
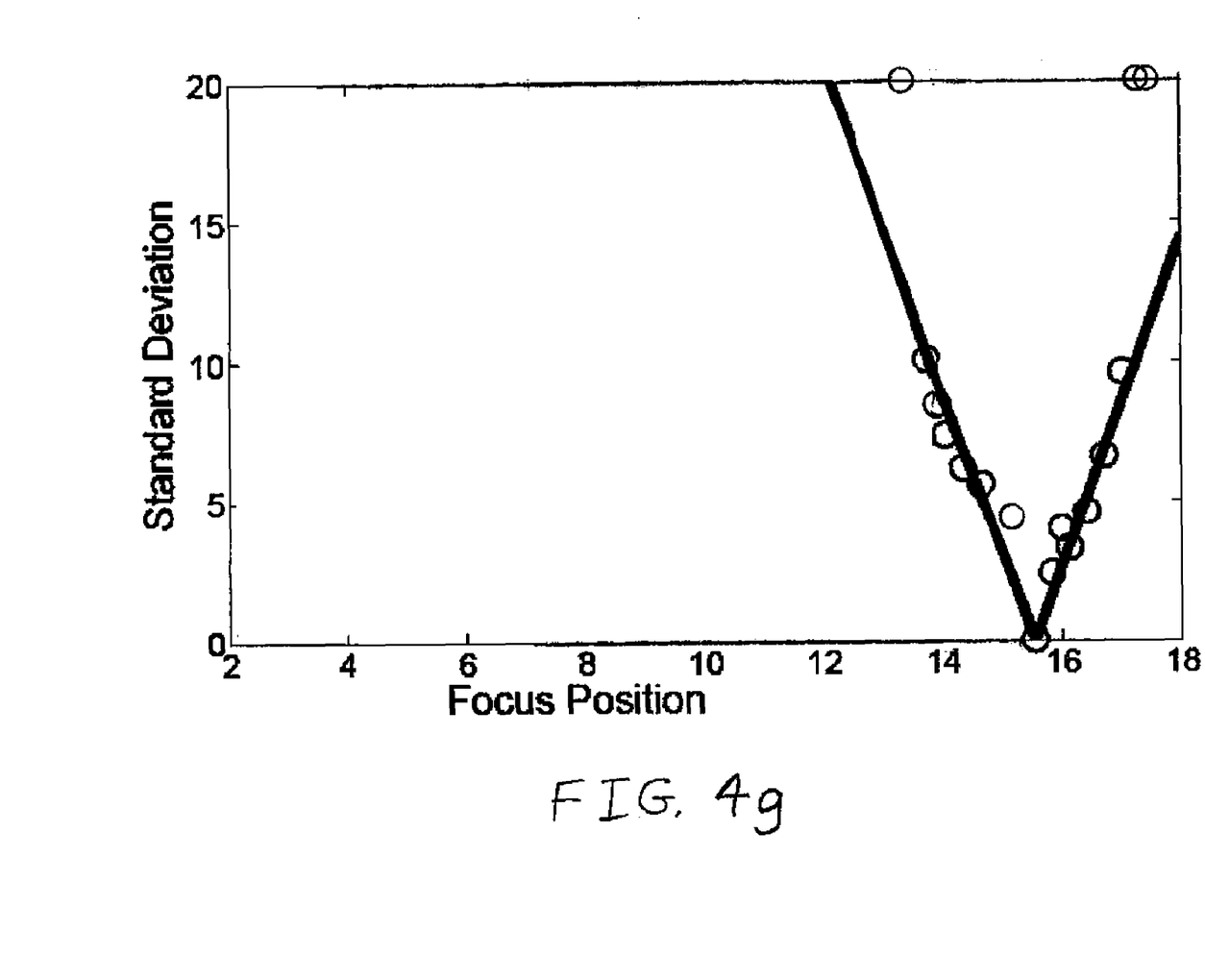
FIG. 4g is the plot of FIG. 4a corresponding to a distance of 1.43 meters between the camera and the iris.
Figure 4H:
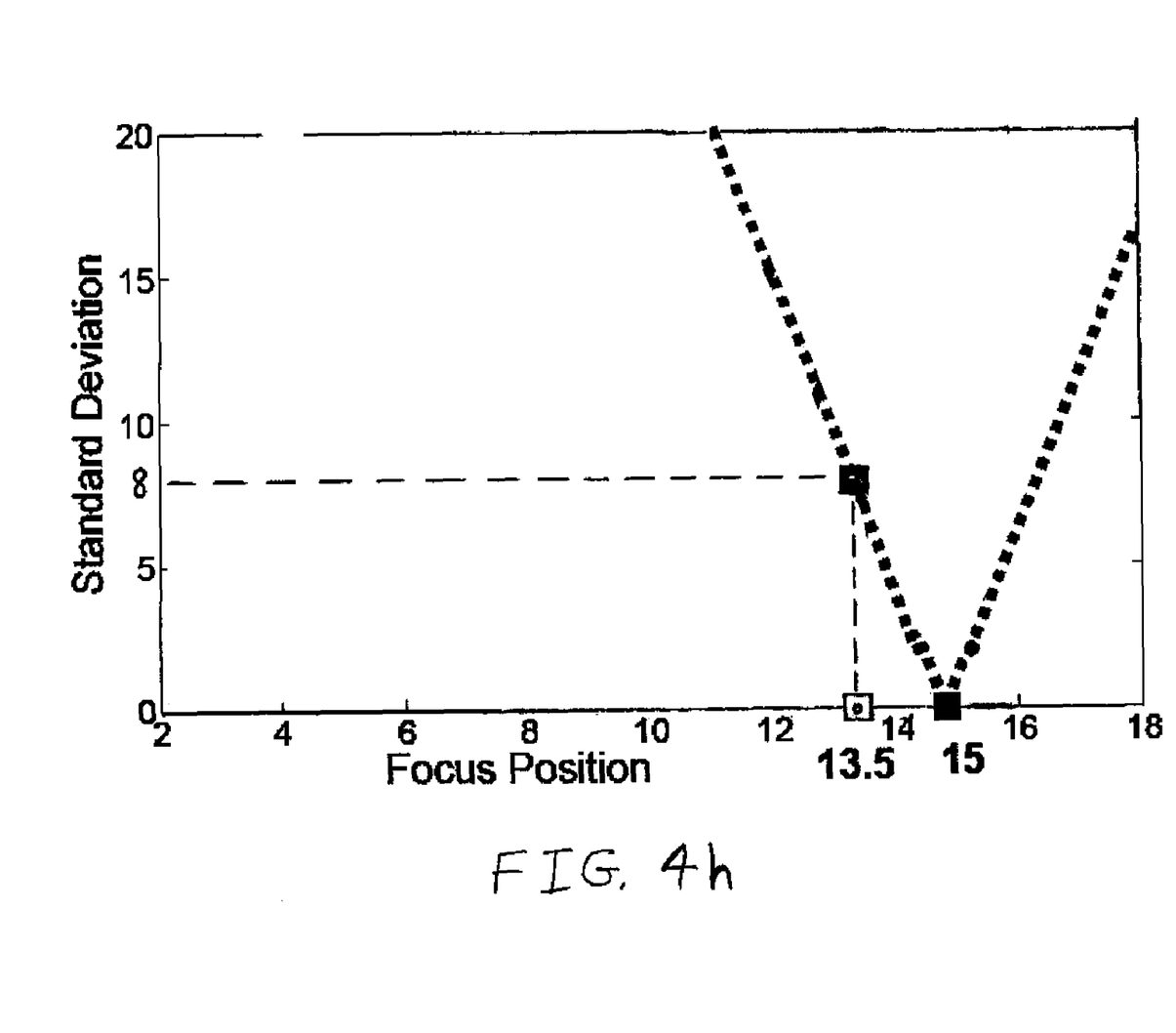
FIG. 4h is a plot illustrating how a standard deviation defining a blur kernel distribution appropriate for deblurring may be calculated according to one embodiment of a method of the present invention.

When a user enters the field of view of the capturing system, the three-dimensional position of the user's eyes after the system delay may be predicted. When the predicted eye position satisfies the triggering condition, the predicted in-focus position $\bar{p}_f$ is computed using Equation (4) and the image is produced at this position. The correct (i.e., actual) depth at the time of image capture (after the system delay) is measured, and the correct or ideal in-focus position $\bar{p}_f$ corresponding to the actual depth measurement is computed. For example, assuming the correct or ideal in-focus position $\bar{p}_f$ is 15 (as shown as the origin of the V-shaped plot in FIG. 4h) for an actual, measured depth, a new model can be interpolated (i.e., Equation (5) with different values for $k_3$ and $k_4$). The new model is illustrated as the dashed V-shaped plot originating at focus position 15 in FIG. 4h. Assuming the predicted in-focus position $\tilde{p}_f$ that was actually used to produce the iris image is 13.5, as indicated by the rectangle at 13.5 in FIG. 4h, the standard deviation $\sigma_h$ that defines the blur kernel distribution appropriate for use in deblurring is shown to be approximately 8 in FIG. 4h. The standard deviation $\sigma_h$ may be computed by taking the predicted focus position of 13.5 that was actually used to produce the image, and plugging that value of 13.5 into Equation (5) along with the values of $k_3$ and $k_4$ that correspond to the actual depth measurement (i.e., the actual depth measurement that corresponds to an ideal focus position of 15).

The above-described calculation of the blur kernel Gaussian distribution may be used to unblur a captured blurred image as described in detail below. Particularly, the process of image deblurring may be formulated in the Bayesian framework by Bayes' theorem, $$P(L|\sigma_h, I) \propto P(I|L, \sigma_h) P(L)$$

where $P(I|L, \sigma_h)$ is the likelihood that L is the clear image given a blur kernel defined by a Gaussian distribution that is, in turn, defined by a standard deviation $\sigma_h$. $P(L)$ represents the prior on the un-blurred image L. A prior probability, or a "prior," is a marginal probability, interpreted as what is known about a variable in the absence of some evidence. The posterior probability is then the conditional probability of the variable taking the evidence into account. The posterior probability may be computed from the prior and the likelihood function via Bayes' theorem.

Different priors chosen in this framework may lead to different deblurring algorithms with different performances. The novel iris deblurring algorithm of the present invention may be applied in any iris capture system to handle defocus blur. The prior on the un-blurred image L may depend upon three prior components that are based on global and local iris image statistics:

$$P(L) = P_g(L) P_p(L) P_s(L).$$

The first prior $P_g(L)$ may be computed from an empirically-determined global distribution of the iris image gradients; $P_p(L)$ may be computed based on characteristics of dark pupil region; and $P_s(L)$ may be computed from the pupil saturation region (i.e., the highlight region of the pupil that is saturated with intensity values of high brightness). For general image deblurring, the global distribution of iris image gradients may be approximated by a mixture of Gaussian distributions, exponential functions, and piece-wise continuous functions. Mixture Gaussian distributions are described in "Removing camera shake from a single photograph", R. Fergus, B. Singh, A. Hertzmann, S. T. Roweis, and W. T. Freeman, ACM Transactions on Graphics, 2006; exponential functions are described in "Image and depth from a conventional camera with a coded aperture", A. Levin, R. Fergus, F. Durand, and W. T. Freeman, ACM Transactions on Graphics, 2007; and piece-wise continuous functions are described in "High-quality motion deblurring from a single image", Q. Shan, J. Jia, and A. Agarwala, In SIGGRAPH, 2008, each of which is incorporated by reference herein in its entirety.

Figure 5:
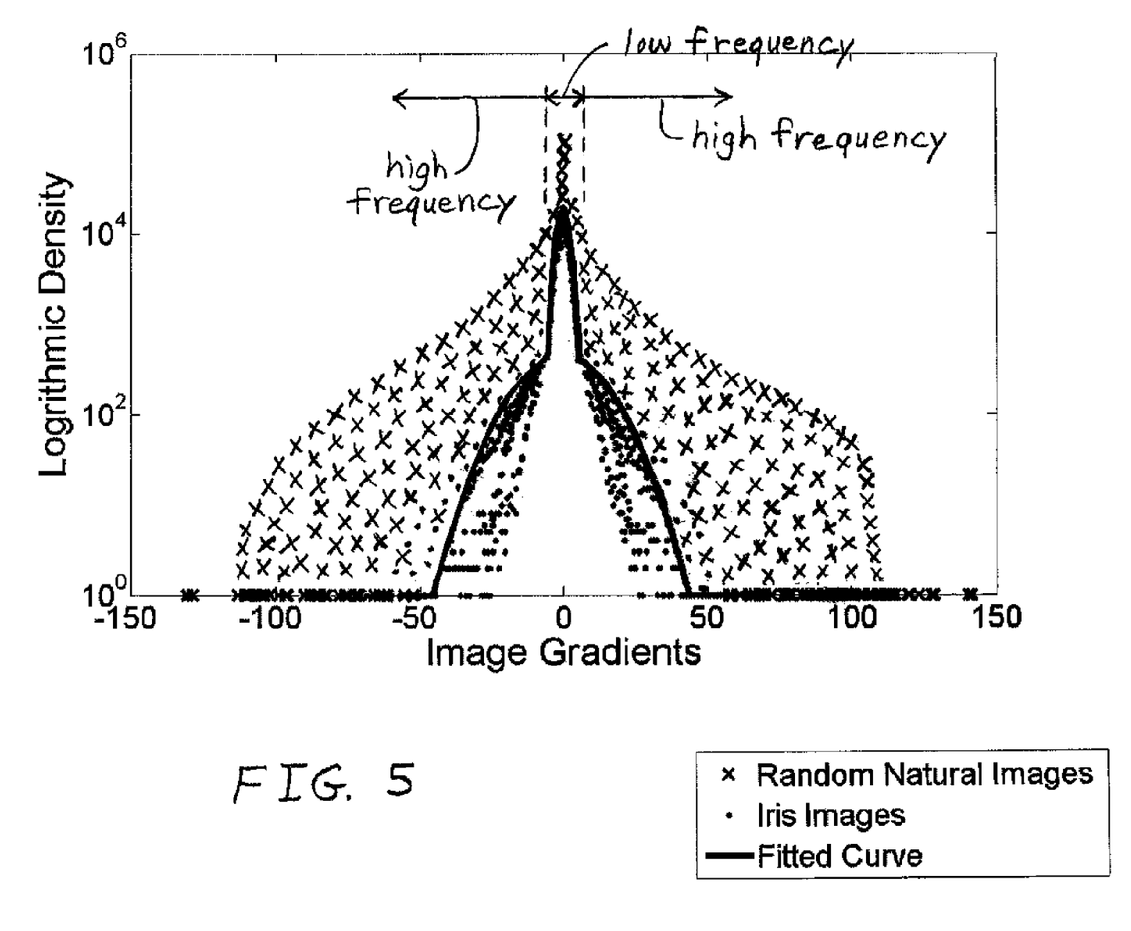
FIG. 5 is a plot of the distributions of image gradients of random natural images and of global iris images.

Because the application domain is iris images rather than natural images, according to one embodiment of the present invention, the global distribution may be computed from iris images only. As illustrated in FIG. 5, the distribution of general natural images (i.e., any images found in nature, such as sky, water, landscape) has a greater uncertainty than the distribution of global iris images. The present invention takes advantage of the tight range of the global iris image statistics.

As a result of the tighter iris image statistics, the distribution of iris image gradients is a stronger prior. A two-piecewise quadratic function (i.e., a piecewise quadratic function having two separate, continuous portions) may be used to approximate the distribution so that the optimization based on this Bayesian problem becomes simpler and more efficient. A general form of the two-piecewise quadratic function may be:

$$P_g(L) \propto \begin{cases} \prod_i e^{a_1(\partial L_i)^2 + b_1}, & |\partial L_i| \leq k \\ \prod_i e^{a_2(\partial L_i)^2 + b_2}, & |\partial L_i| > k \end{cases}$$

where $\partial L_i$ is the gradient for a pixel and k is the threshold between two functions. Such a two-piecewise quadratic function may be represented by the fitted curve in FIG. 5, wherein the threshold k is at the transitions between the low frequency and high frequency regions.

The second $P_p(L)$ and third $P_s(L)$ priors may be computed from the local pupil region because the dark pupil region is likely to be smooth as compared with the nearby iris patterns, and the highlight region is likely saturated. Therefore, these two priors may be particularly useful in recovering nearby iris patterns. As the smooth pupil region tends to have small gradients that are not sensitive to the defocus blur, and the saturated highlight region tends to contain the highest intensity, the two priors may be computed as following:

$$P_p(L) \propto \prod_{i \in \Omega_1} N(\partial L_i - \partial I_i \mid 0, \sigma_p)$$

$$P_s(L) \propto \prod_{i \in \Omega_2} N(L_i - 255 \mid 0, \sigma_s),$$

where $\Omega_1$ is the dark pupil region (i.e., excluding the highlight region), and $\Omega_2$ is the saturated highlight region within the pupil. The dark pupil region and the saturated highlight region within the pupil can be detected by image processing techniques, such as thresholding, erosion and dilation. The 255 term in the $P_s(L)$ formula represents the highest (i.e., whitest) color value on a scale of 0 to 255.

Putting all of these priors together, this iris deblurring problem may be solved by minimizing an energy function E in the following quadratic form:

$$E \propto \|I - L \otimes h\|^2 + \lambda_1 (\|a_1(\partial L)^2 + b_1\| \cdot M_1 + \|a_2(\partial L)^2 + b_2\| \cdot M_2) + \lambda_2 (\|\partial L - \partial I\|^2 \cdot M_3 + \|L - 255\|^2 \cdot M_4),$$

where $M_1$, $M_2$, $M_3$, and $M_4$ are masks of low-frequency region, high-frequency region, dark pupil region, and high-light region in the pupil; I is the known blurred image captured by the camera lens; h is the blur kernel, which may be estimated as discussed in detail above; and L is the clear image that is being determined. Thus, given known values for the blurred image I and the blur kernel h, an image L may be determined that minimizes E, and this image L may be used as a representation of a clear, unblurred version of the produced blurred image I.

The deblur kernel h can be estimated based on the depth information or focus scores. If the blur kernel is not known, it is possible to add a Gaussian prior in place of the blur kernel in order to convert the non-blind deconvolution into a blind one, which still can be solved by the optimization framework.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of identifying a living being, comprising the steps of:
    using a camera to capture a blurred visual image of an iris of the living being;
    digitally unblurring the blurred visual image based on a distribution of eye image gradients in an empirically-collected sample of eye images and distributions from characteristics of local regions;
    processing the unblurred image to determine an identity of the living being; and
    approximating the distribution of eye image gradients as a quadratic piecewise function.

2. The method of claim 1 comprising the further step of computing the distributions from characteristics of local regions from iris images only.

3. The method of claim 1 wherein the distribution comprises a distribution of iris image gradients.

4. A method of identifying a living being, comprising the steps of:
    using a camera to capture a blurred visual image of an iris of the living being;
    digitally unblurring the blurred visual image based on a distribution of eye image gradients in an empirically-collected sample of eye images and distributions from characteristics of local regions;
    processing the unblurred image to determine an identity of the living being; and
    forming the distribution of eye image gradients from statistics derived from measurements of a population of eye regions.

5. A method of identifying a living being, comprising the steps of:
    using a camera to capture a blurred visual image of an iris of the living being;
    digitally unblurring the blurred visual image based on a distribution of eye image gradients in an empirically-collected sample of eye images and distributions from characteristics of local regions;
    processing the unblurred image to determine an identity of the living being;
    forming the distributions from characteristics of local regions from characteristics of intensity value of pupil region; and forming the distribution of eye image gradients from global intensity value statistics derived from measurements of a population of eye regions.

6. The method of claim 5 wherein the distributions from characteristics of intensity value of pupil region include:
   distribution from local highlight intensity value of pupil region; and
   distribution from local non-highlight intensity value of pupil region.

7. The method of claim 6 comprising the further steps of:
   detecting the highlight regions and the non-highlight regions around pupil region in a captured image;
   deriving the distribution of the local highlight intensity value from the portion identified as corresponding to the highlight regions; and
   deriving the distribution of the local non-highlight intensity value from the portion identified as corresponding to the non-highlight regions.

8. A method of identifying a living being, comprising the steps of:
   using a camera to capture a blurred visual image of an iris of the living being;
   digitally unblurring the blurred visual image based on:
      distributions from intensity value of pupil region; and
      distribution from global intensity value statistics derived from measurements of a population of eye regions;
   processing the unblurred image to determine an identity of the living being; and
   modeling the global intensity value statistics as a quadratic piecewise function.

9. The method of claim 8 wherein the processing step includes matching the unblurred image to a stored image of an iris of the living being.

10. The method of claim 8 comprising the further step of estimating a blur kernel, the unblurring step including digitally unblurring the blurred visual image based on the estimated blur kernel.

11. A method of identifying a living being, comprising the steps of:
   using a camera to capture a blurred visual image of an iris of the living being;
   digitally unblurring the blurred visual image based on:
      distributions from intensity value of pupil region; and
      distribution from global intensity value statistics derived from measurements of a population of eye regions; and
   processing the unblurred image to determine an identity of the living being, wherein distributions from characteristics of intensity value of pupil region include:
   distribution from local highlight intensity value of pupil region; and
   distribution from local non-highlight intensity value of pupil region.

12. The method of claim 11 comprising the further steps of:
   detecting the highlight regions and the non-highlight regions around pupil region in a captured image;
   deriving the distribution of the local highlight intensity value from the portion identified as corresponding to the highlight regions; and
   deriving the distribution of the local non-highlight highlight intensity value from the portion identified as corresponding to the non-highlight regions.

13. A method of identifying a living being, comprising the steps of:
   capturing a blurred visual image of an iris of the living being;
   digitally unblurring the blurred visual image based on:
      distribution from local highlight intensity value of pupil region;
      distribution from local non-highlight intensity value of pupil region; and
      distribution of global intensity value statistics derived from measurements of a population of eye regions;
   processing the unblurred image to determine an identity of the living being; and
   modeling the global intensity value statistics as a quadratic piecewise function.

14. The method of claim 13 wherein the quadratic piecewise function consists of two separate continuous functions.

15. The method of claim 13 wherein the processing step includes matching the unblurred image to a stored image of an iris of the living being.

16. The method of claim 13 comprising the further step of estimating a blur kernel, the unblurring step including digitally unblurring the blurred visual image based on the estimated blur kernel.

17. A method of identifying a living being, comprising the steps of:
   capturing a blurred visual image of an iris of the living being;
   digitally unblurring the blurred visual image based on:
      distribution from local highlight intensity value of pupil region;
      distribution from local non-highlight intensity value of pupil region; and
      distribution of global intensity value statistics derived from measurements of a population of eye regions;
   processing the unblurred image to determine an identity of the living being;
   detecting the highlight regions and the non-highlight regions around pupil region in a captured image;
   deriving the distribution of the local highlight intensity value from the portion identified as corresponding to the highlight regions; and
   deriving the distribution of the local non-highlight highlight intensity value from the portion identified as corresponding to the non-highlight regions.

* * * * *